(12) United States Patent
Schedel et al.

(10) Patent No.: US 10,611,210 B2
(45) Date of Patent: Apr. 7, 2020

(54) HEAT PUMP SYSTEM FOR CLIMATE CONTROL OF A VEHICLE, AND METHOD FOR OPERATING A HEAT PUMP SYSTEM OF THIS TYPE

(71) Applicant: Bayerische Motoren Werke Aktiengesellschaft, Munich (DE)

(72) Inventors: Felix Schedel, Gauting (DE); Oliver Horn, Munich (DE); Philipp Hofmann, Munich (DE); Peter Satzger, Landsberg am Lech (DE); Robert Herbolzheimer, Groebenzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/453,699

(22) Filed: Mar. 8, 2017

(65) Prior Publication Data
US 2017/0174038 A1 Jun. 22, 2017

Related U.S. Application Data

(63) Continuation of application No. PCT/EP2015/069207, filed on Aug. 21, 2015.

(30) Foreign Application Priority Data

Sep. 9, 2014 (DE) .......................... 10 2014 217 960

(51) Int. Cl.
*B60H 1/00* (2006.01)
*B60H 1/32* (2006.01)

(52) U.S. Cl.
CPC ..... *B60H 1/00385* (2013.01); *B60H 1/00278* (2013.01); *B60H 1/00899* (2013.01);
(Continued)

(58) Field of Classification Search
CPC ............ B60H 1/00278; B60H 1/00385; B60H 1/00899; B60H 1/3213;
(Continued)

(56) References Cited

U.S. PATENT DOCUMENTS

| | | | | |
|---|---|---|---|---|
| 5,996,360 A | * | 12/1999 | Tanaka ............... | B60H 1/00907 62/159 |
| 6,047,770 A | * | 4/2000 | Suzuki ............... | B60H 1/00007 165/202 |

(Continued)

FOREIGN PATENT DOCUMENTS

| | | |
|---|---|---|
| DE | 101 28 877 A1 | 12/2002 |
| DE | 603 19 291 T2 | 2/2009 |

(Continued)

OTHER PUBLICATIONS

PCT/EP2015/069207, International Search Report dated Dec. 3, 2015 (Three (3) pages).

(Continued)

*Primary Examiner* — Frantz F Jules
*Assistant Examiner* — Martha Tadesse
(74) *Attorney, Agent, or Firm* — Crowell & Moring LLP

(57) ABSTRACT

A heat pump system for climate control of an electric or hybrid vehicle includes an air conditioning unit having a heating heat exchanger, and an air conditioning unit evaporator having a refrigeration circuit, in which the air conditioning unit evaporator and a condenser are arranged. The refrigeration circuit includes a low temperature (LT) circuit in which at least one electrical power component is arranged. The heat pump system is configured to switch over between a cooling mode and a heating mode. The condenser, which is configured to transfer heat into the LT circuit, and an LT cooler are incorporated into the LT circuit. In the heating mode, the condenser outputs heat into the LT circuit (Continued)

and from there into a heating circuit, in which the heating heat exchanger is arranged, and in the cooling mode, the condenser outputs heat via the LT circuit to the LT cooler.

18 Claims, 2 Drawing Sheets

(52) U.S. Cl.
CPC ....... *B60H 1/3213* (2013.01); *B60H 1/32281* (2019.05); *B60H 2001/00307* (2013.01); *B60H 2001/00928* (2013.01); *B60H 2001/00949* (2013.01); *B60H 2001/00957* (2013.01)

(58) Field of Classification Search
CPC ........... B60H 2001/00928; B60H 2001/00949; B60H 2001/00957; B60H 2001/00307; B60H 1/143; B60H 1/14
USPC ............................. 62/119, 498; 165/104.31
See application file for complete search history.

(56) References Cited

U.S. PATENT DOCUMENTS

| 9,233,593 | B2 | 1/2016 | Beschieru et al. | |
|---|---|---|---|---|
| 2004/0011070 | A1* | 1/2004 | Satzger | B60H 1/00885 62/323.1 |
| 2011/0146942 | A1 | 6/2011 | Wittmann et al. | |
| 2011/0284309 | A1* | 11/2011 | Gooden | B60H 1/14 180/339 |
| 2012/0090806 | A1* | 4/2012 | Beschieru | B60H 1/00278 165/41 |
| 2012/0222846 | A1* | 9/2012 | Kadle | F28D 9/005 165/166 |
| 2012/0234518 | A1* | 9/2012 | Brodie | B60H 1/00278 165/104.31 |
| 2012/0290161 | A1* | 11/2012 | Takeda | B60L 1/00 701/22 |
| 2013/0219939 | A1* | 8/2013 | Eisenhour | F25B 5/02 62/160 |
| 2014/0020415 | A1* | 1/2014 | Heyl | F25B 13/00 62/119 |

FOREIGN PATENT DOCUMENTS

| DE | 10 2010 038 406 A1 | 1/2012 | | |
|---|---|---|---|---|
| DE | 10 2010 048 853 A1 | 4/2012 | | |
| DE | 10 2011 108 729 A1 | 1/2013 | | |
| DE | 10 2012 024 080 A1 | 3/2014 | | |
| DE | 10 2012 108 043 A1 | 5/2014 | | |
| DE | 10 2013 206 626 A1 | 10/2014 | | |
| EP | 1266779 A2 | * | 12/2002 | ......... B60H 1/00885 |
| EP | 1 291 206 A1 | 3/2003 | | |
| EP | 2 263 894 A1 | 12/2010 | | |
| EP | 2263894 A1 | * | 12/2010 | ......... B60H 1/00492 |
| FR | 2 954 463 A1 | 6/2011 | | |
| FR | 2 967 759 A1 | 5/2012 | | |
| FR | 2 992 260 A1 | 12/2013 | | |
| FR | 2992260 A1 | * | 12/2013 | |
| FR | 2992260 B1 | * | 10/2015 | |
| WO | WO 02/092368 A1 | 11/2002 | | |
| WO | WO 2011/029538 A1 | 3/2011 | | |

OTHER PUBLICATIONS

German Search Report issued in German counterpart application No. 10 2014 217 960.2 dated May 8, 2015, with Statement of Relevancy (Fourteen (14) pages).

Chinese Office Action issued in Chinese counterpart application No. 201580032918.7 dated May 2, 2018, with partial English translation (Eighteen (18) pages).

\* cited by examiner

HEAT PUMP SYSTEM FOR CLIMATE CONTROL OF A VEHICLE, AND METHOD FOR OPERATING A HEAT PUMP SYSTEM OF THIS TYPE

CROSS REFERENCE TO RELATED APPLICATIONS

This application is a continuation of PCT International Application No. PCT/EP2015/069207, filed Aug. 21, 2015, which claims priority under 35 U.S.C. § 119 from German Patent Application No. 10 2014 217 960.2, filed Sep. 9, 2014, the entire disclosures of which are herein expressly incorporated by reference.

BACKGROUND AND SUMMARY OF THE INVENTION

The invention relates to a heat pump system for climate control of a vehicle, in particular an electric or hybrid vehicle, having an air conditioning unit which comprises a heat exchanger for heating and an air conditioning unit evaporator, having a refrigeration circuit, in which the air conditioning unit evaporator and a condenser are arranged, having a low temperature (LT) circuit, in which an electrical power component is arranged, it being possible for the heat pump system to be switched over between a cooling mode and a heating mode. Furthermore, the invention relates to a method for operating a heat pump system of this type.

A heat pump system of this type is disclosed, for example, in WO 2011/029538 A1. In addition to a utilization of ambient heat, a utilization of the waste heat, for example of a battery, can also be gathered there. Here, the waste heat is fed to an evaporator of a refrigeration circuit of the heat pump, via which evaporator the refrigerant of the refrigeration circuit is evaporated. A cooler-side heat exchanger is likewise used as an evaporator for the refrigeration circuit for the additional utilization of the ambient heat. Furthermore, a conventional evaporator of an air conditioning unit for passenger compartment climate control is incorporated into the refrigeration circuit itself. In a heating mode for heating the passenger compartment at low external temperatures, said normal evaporator is not activated, that is to say is not flowed through by the refrigerant. Rather, the heat is absorbed selectively via the evaporator which is assigned to the battery or the cooler-side ambient heat evaporator, and is output via a condenser to the air for passenger compartment heating.

In general, the problem arises in electric vehicles or else hybrid vehicles that an internal combustion engine which continuously produces heat and an associated high temperature circuit are usually not present and the heat which is required for heating the passenger compartment of the vehicle has to be taken from a different source. Here, electrical power components, in particular, may be suitable as heat sources which are usually arranged in the LT circuit, that is to say a low temperature circuit or else simply merely a cooling circuit: for example, an electric drive machine, that is to say an electric motor, or else electrical power components, such as inverters, direct current converters, charging electronics or the like. In some circumstances, a utilization of the heat of the high voltage accumulator, that is to say of the battery of the vehicle, is also possible.

Thus, for example, the unpublished document DE 10 2013 206626.0 which traces back to the applicant describes a heat pump system for climate control of a vehicle, having a heating mode for heating a passenger compartment, comprising a refrigeration circuit with a condenser for transferring heat from the refrigeration circuit into the passenger compartment and having an air conditioning unit evaporator for climate control of the passenger compartment. At least one inner evaporator is arranged exclusively as a further evaporator for an absorption of heat into the refrigeration circuit, by way of which inner evaporator waste heat from the vehicle can be utilized. As a result, in particular, the occurrence of icing on an ambient heat exchanger is avoided, since either an ambient heat exchanger of this type is dispensed with completely in the refrigeration circuit or else since there is at least no ambient heat exchanger in the refrigeration circuit, which ambient heat exchanger is utilized as an evaporator for transferring heat from the surroundings into the refrigeration circuit. In order for it to be possible nevertheless to control the climate of and, in particular, heat the passenger compartment in a desired way independently of the respective operating situation and the ambient conditions, even at low external temperatures, a plurality of internal heat sources of the vehicle are utilized to heat the passenger compartment in the heating mode.

However, the different heat sources typically have to be incorporated in each case separately, which results in complex connections. In order, in particular, to heat the passenger compartment and at the same time to cool one or more of the power components, complex connections with a multiplicity of valves are disadvantageously necessary.

As has already been indicated above, heat is also taken from the ambient air as an alternative or in addition. However, on account of the possibly greatly changing external temperature or possible icing of a heat exchanger or a heat transfer means provided for this purpose, said heat source provides an unreliable heat supply. In addition, the refrigerant which is used can possibly be used merely above a certain minimum temperature on account of its material properties. For heating at low temperatures, additional heaters, which are known as auxiliary heaters, are then frequently necessary, by way of which the complexity of the system is increased further and additional costs, additional weight and additional installation space requirements are produced.

Therefore, an object of the invention is specifying an improved heat pump system for a vehicle, in particular for an electric or hybrid vehicle, which heat pump system is constructed as simply as possible and makes cooling and heating of the passenger compartment of the vehicle possible.

The heat pump system is configured for climate control of a vehicle, in particular an electric or hybrid vehicle, and has an air conditioning unit which comprises a heat exchanger for heating and an air conditioning unit evaporator. Furthermore, the heat pump system has a refrigeration circuit, in which the air conditioning unit evaporator and a condenser are arranged. Furthermore, the heat pump system has an LT circuit, in which an electrical power component is arranged. The heat pump system can be switched over between a cooling mode and a heating mode. A switchover valve is arranged for switching over between the heating mode and the cooling mode. A condenser for transferring heat into the LT circuit and an LT cooler are incorporated into the LT circuit. In the heating mode, the condenser outputs heat into the LT circuit and from there into a heating circuit, in which the heat exchanger for heating is arranged, and, in the cooling mode, the condenser outputs heat via the LT circuit to the LT cooler which outputs the heat to the surroundings again.

The advantages which are achieved by way of the invention consist, in particular, in that a switchover between the heating and cooling mode takes place by means of merely one switchover valve and, as a result of switching over, the condenser can be used firstly for heat utilization for the purpose of passenger compartment heating and secondly for outputting heat to the surroundings. Here, the refrigeration circuit and the LT circuit are of particularly simple configuration, and the heat pump system is particularly inexpensive on account of merely a few required components. All known refrigerants can advantageously be used as refrigerant in the refrigeration circuit, in particular the refrigerants R134a, R1234YF and R744 which are customary in vehicles.

As a result of the utilization of waste heat of the power component, furthermore, the required absorption of heat from the surroundings, in particular in the steady state mode of the vehicle, is advantageously reduced in such a way that icing of the LT cooler can be avoided. As a result, furthermore, a lower air throughput through the LT cooler is also necessary, as a result of which said LT cooler can firstly be operated at a low fan speed for the purpose of noise reduction and secondly the efficiency thereof is advantageously increased. By means of suitable control or regulation of the various components, it is possible, in particular, to cool the power component and at the same time to optionally heat or cool the passenger compartment. Here, in particular, an absorption of heat from the surroundings and/or from the power component is possible, and an output of heat to the surroundings or to the heating circuit is possible. In addition, it is advantageously possible, in particular if a plurality of heat sources are used, to dispense with an auxiliary heater for passenger compartment climate control or at least to reduce the power rating thereof and therefore the manufacturing costs thereof.

The air conditioning unit serves for climate control, that is to say heating or cooling of the passenger compartment, and to this end comprises two heat exchangers, one heat exchanger being the heat exchanger for heating and the other being the air conditioning unit evaporator. The heat exchanger for heating is arranged in the heating circuit and serves to output heat to the passenger compartment; the air conditioning unit evaporator is arranged in the refrigeration circuit and serves to absorb heat from the passenger compartment in the air recirculation mode and/or from the air which is to be fed to the passenger compartment in the external air mode into the refrigeration circuit. In particular, a valve is arranged in the refrigeration circuit upstream of the air conditioning unit evaporator, which valve is closed in the, in particular pure, that is to say exclusive, heating mode and serves as an expansion member in the cooling mode.

Furthermore, a compressor is arranged in the refrigeration circuit between the air conditioning unit evaporator and the condenser, which compressor feeds, in particular, compressed coolant to the condenser for the output of heat to the LT circuit. In addition, an inner heat exchanger is expediently arranged in the refrigeration circuit in order to increase performance during operation, which inner heat exchanger, in particular, conveys heat from that side of the refrigeration circuit which lies upstream of the air conditioning unit evaporator to the side which lies downstream thereof. An HVA evaporator is suitably arranged as an additional heat source in the refrigeration circuit, which HVA evaporator absorbs waste heat which is generated by the high voltage accumulator (also called HVA) of the vehicle into the refrigeration circuit and, as a result, firstly cools the high voltage accumulator and secondly makes it possible to utilize the waste heat.

The LT circuit is a low temperature circuit and a cooling circuit, the coolant is, for example, a water/glycol mixture, and there is a temperature of from approximately −20 to +60° C. in the LT circuit depending on the operating mode. The LT cooler serves to exchange heat with the surroundings of the vehicle, that is to say, in particular, the environment or the space on the outer side of the vehicle. The LT cooler preferably absorbs heat in the heating mode and outputs heat in the cooling mode. In other words: heat is expediently absorbed from the surroundings into the LT circuit via the LT cooler in the heating mode. As a result, it is possible, in particular, to provide additional heat for heating purposes. This is made possible, in particular, by virtue of the fact that a temperature which is lower than the ambient temperature can be generated by means of the heat exchanger in the LT circuit. However, an absorption of heat in the heating mode advantageously takes place merely in so far as the heat which is required for heating is not taken from other heat sources.

The electrical power component which is arranged in the LT circuit is, in particular, an electric drive machine, that is to say an electric motor of the vehicle, a power electronics system, a control electronics system, a DC converter, a charging electronics system or the like. Here, "arranged in the LT circuit" is understood to mean that an exchange of heat is possible between the power component and the LT circuit, more precisely the cooling liquid. In particular, it is possible that there are a plurality of electrical power components which are connected parallel to one another or in series, or a combination thereof, in the LT circuit.

The heating circuit is, in particular, a part of the LT circuit and comprises a separate heating branch. Here, depending on the switching state, the switchover valve either makes a circulation of coolant in the heating circuit or bypassing of the heating branch possible. Here, in the cooling mode of the heat pump system, bypassing of the heating branch takes place, that is to say the heating circuit is not used, and, correspondingly, the circulation of cooling liquid in the heating circuit takes place in the heating mode. To this end, in particular, a heating circuit pump is arranged in the heating circuit, which heating circuit pump is activated merely in the heating mode, that is to say pumps coolant. In the heating mode, the heat exchanger for heating of the air conditioning unit is then flowed through by coolant and outputs heat to the passenger compartment.

In one advantageous development, in addition to the heating mode and the cooling mode, the heat pump system can be switched over into a mixed mode, as a result of which it is possible, in particular, to carry out heating and cooling tasks at the same time. In the mixed mode, in particular, bypassing of the heating circuit by merely a first proportion of the coolant then takes place, while a second proportion of the coolant is conveyed through the heating circuit.

The condenser serves to transfer heat from the refrigeration circuit into the LT circuit and is designed suitably depending on the refrigerant and coolant used. For example, the condenser is a water-cooled plate heat exchanger, that is to say the coolant is a water/glycol mixture. As an alternative and, in particular, in the case of R744 as refrigerant, the condenser is what is known as a gas cooler which, however, is generally also called a condenser. In the heating mode, heat is transferred from the refrigeration circuit into the LT circuit by means of the condenser and to the heat exchanger for heating by way of diverting the cooling liquid into the heating circuit, in order finally to be used for heating the passenger compartment of the vehicle. In the cooling mode, in contrast, the heat which is transferred from the condenser into the LT circuit is transferred to the LT cooler and is finally output to the surroundings of the vehicle.

In one advantageous development, a heat exchanger is connected in parallel to the air conditioning unit evaporator, in particular by means of an evaporator bypass, in order to transfer heat from the LT circuit into the refrigeration circuit in the heating mode. The heat exchanger is, in particular, an evaporator with regard to the refrigerant. As a result, a utilization of heat from various heat sources is made possible in a particularly simple way. In particular, in the heating mode, the waste heat of the electrical power component is transferred by means of the heat exchanger into the refrigeration circuit and from there into the heating circuit by means of the condenser. Here, depending on the external temperature, no heat absorption, in particular, takes place via the air conditioning unit evaporator. In the cooling mode, the heat exchanger is deactivated, for example by means of a valve which is arranged in the evaporator bypass, and no heat transfer takes place in this way. The heat exchanger is preferably configured as a plate heat exchanger.

In one advantageous development, a switchable heat exchanger bypass is arranged in the LT circuit, for bypassing the heat exchanger or as a parallel branch with respect to the latter. The heat exchanger possibly allows merely a defined, maximum coolant volumetric flow, in particular in the case of a pressure build-up provided by way of a cooling circuit pump which is arranged in the LT circuit. If, however, the waste heat which is generated by the power component is particularly great, it is possible by way of the heat exchanger bypass, in particular, to nevertheless provide an overall coolant volumetric flow which suffices to cool the power component despite the limited coolant volumetric flow through the heat exchanger. Therefore, a valve is expediently arranged in the heat exchanger bypass, which valve, in particular, opens the heat exchanger bypass in this case and, as a result, prevents overheating of the power component. The valve is suitably a pressure-controlled valve, for example a pressure relief valve.

In one preferred refinement, the condenser, the heat exchanger and the LT cooler are connected in series in the LT circuit, the heat exchanger being arranged between the condenser and the LT cooler. By way of said arrangement, an optimum arrangement with regard to the transfer of heat is realized.

In a suitable variant, the heat exchanger is connected in parallel to the LT cooler in the LT circuit. As a result, in particular, the coolant volumetric flow which is present in the heat exchanger is reduced, and the heat exchanger can be of smaller dimensions, with regard to its throughflow performance, and therefore can be of less expensive design.

In a further, advantageous development, the heat exchanger is arranged in the LT circuit downstream of the electrical power component and, in particular, adjacently with respect to the latter. Here, adjacent is understood to mean, in particular, in the spatial vicinity. As a result, it is possible to arrange the heat exchanger particularly close to the power component and to utilize the waste heat which is generated by the power component particularly efficiently on account of said spatial closeness, that is to say to transfer said waste heat into the refrigeration circuit by means of the heat exchanger. In the case of a spatially close arrangement of the compressor and the power component, in particular, it is advantageously possible to optimize the length of the lines which connect the compressor to the heat exchanger, as a result of which, in particular, pressure losses can be reduced on a low pressure side of the refrigeration circuit. As a result, it is possible, in particular, to operate the refrigeration circuit particularly efficiently.

In order to convey the coolant, in particular, at least one cooling circuit pump is arranged in the LT circuit, preferably adjacently with respect to the heat exchanger and upstream thereof. The cooling circuit pump typically itself generates waste heat which can be utilized particularly efficiently by way of the arrangement upstream with regard to the heat exchanger. As an alternative, the cooling circuit pump is arranged in the LT circuit upstream with regard to the condenser, which results, in particular, in structural advantages during the installation of the cooling circuit pump in the vehicle. Here, the cooling circuit pump is arranged, in particular, upstream of a possibly present fork of the LT circuit into a plurality of branches which run parallel to one another. In one preferred refinement, the cooling circuit pump generates a higher pressure than the heating circuit pump, as a result of which, in particular, a return flow of coolant from the heating circuit into other sections of the LT circuit, that is to say a reversal of the flow direction in a feed line section to the heating circuit, is prevented in a particularly simple way. As an alternative or in addition, a check valve is arranged in the feed line section for closing the heating circuit and for preventing a flow reversal.

The condenser preferably outputs heat from the refrigeration circuit to the LT circuit both in the cooling mode and in the heating mode and, in particular, also in the mixed mode, as a result of which the condenser can therefore be of particularly simple design. Accordingly, the heat is transferred in the same direction in all operating modes. As a result, the condenser acts, in particular exclusively, as a condenser with regard to the refrigerant.

In a further, preferred refinement, the coolant flows through the condenser in the same direction in the cooling mode and in the heating mode. In this way, particularly simple connections of the components of the LT circuit can be realized. In particular, the switchover between the heating and cooling mode is also simplified such that a correspondingly rapid switchover is possible as a result of dispensing with a reversal of the flow direction.

For particularly simple realization of the heating branch, the heating circuit is connected to the LT circuit upstream and downstream of the condenser in one preferred refinement. Here, the heating circuit comprises, in particular, two junctions, one junction providing an inlet of the heating branch and the other junction providing an outlet. Here, the inlet is arranged downstream of the condenser and the outlet is arranged upstream. The heating branch then extends, in particular, downstream of the inlet as far as the outlet. In particular, the heating circuit pump and the heat exchanger for heating are arranged on the heating branch.

The switchover valve is expediently arranged on one of the junctions, preferably downstream of the condenser. The switchover valve is preferably configured as a 3/2-way valve for switching over between the cooling mode and the heating mode. This configuration is particularly simple and, in particular, makes it possible to switch over between the heating mode and the cooling mode and, in particular, a mixed mode by means of merely a single valve. For the heating or cooling mode, the switchover valve is switched, in particular, in such a way that the entire volumetric flow is guided either into the heating circuit or into the LT circuit. The mixed mode is then made possible, in particular, by way of switching to and fro, that is to say by means of rapid changing between the heating and cooling mode. As an alternative, the 3/2-way valve is configured as what is known as a duo valve and, in the mixed mode, makes two continuous part volumetric flows possible, one into the LT circuit and the other into the heating circuit.

The electrical power component is expediently arranged in the LT circuit parallel to the condenser. It is avoided as a result, in particular, that the power component is connected in series with the condenser and is possibly cooled merely poorly in the heating mode. In other words: efficient cooling of the power component with the heating mode at the same time is made possible by way of a parallel arrangement of the condenser and the power component. In particular, the parallel arrangement makes cooling of the power component and an output of heat from the condenser to the LT circuit possible at the same time.

In one expedient refinement, the LT circuit comprises a first LT cooler bypass, for bypassing the LT cooler. During starting of the vehicle, the cooling liquid possibly has a higher temperature than the external temperature of the vehicle. In this case, a heat loss to the surroundings is prevented by way of bypassing the LT cooler by means of the first LT cooler bypass. As an alternative or in addition, the LT circuit comprises a second LT cooler bypass in a further expedient refinement, in which second LT cooler bypass an equalizing tank is arranged for pressure equalization or filling level equalization in the LT circuit.

It is possible, in particular in combination with the unpublished document DE 10 2013 206626.0 which traces back to the applicant, to achieve a particularly efficient method of operation by way of the above-described arrangement; here, the transfer of heat from the surroundings into the LT circuit is advantageously determined by way of adjustment of the temperature in the LT circuit. To this end, the heat pump system expediently has a control electronics system. As a result, it is possible, in particular, to absorb precisely a quantity of heat by means of the LT cooler, as is necessary in combination with the heat which is introduced into the LT circuit by the power component, in order to avoid icing of the LT cooler. This is possible, in particular, by way of the control, described in DE 10 2013 206626.0, of the heat which is output by the power component.

Depending on the external temperature or in a manner which is dependent on other environmental conditions, the heat pump system is expediently operated in a mixed mode, a passenger compartment of the vehicle, in particular, being dehumidified and/or the power component being cooled in the heating mode. It is possible, for example, to dehumidify the passenger compartment of the vehicle in the heating mode by way of opening of the valve upstream of the air conditioning unit evaporator. As an alternative, a mixed mode is possible in such a way that the power component is cooled in the heating mode, that is to say during heating of the passenger compartment. In particular, it is advantageously possible, by way of suitable switching of valves upstream of the high voltage accumulator, the power component, the air conditioning unit evaporator and the heat exchanger for heating, to integrate them into the cooling or refrigeration circuit in each case independently of one another. In this way, a mixed mode can be realized, in which the passenger compartment is cooled, heated or dehumidified and at the same time cooling of the high voltage accumulator and/or the power component is possible. Particularly in the case of dehumidifying, the heating mode and the cooling mode are combined to form a mixed mode.

In the following text, exemplary embodiments of the invention will be explained in greater detail using a drawing, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
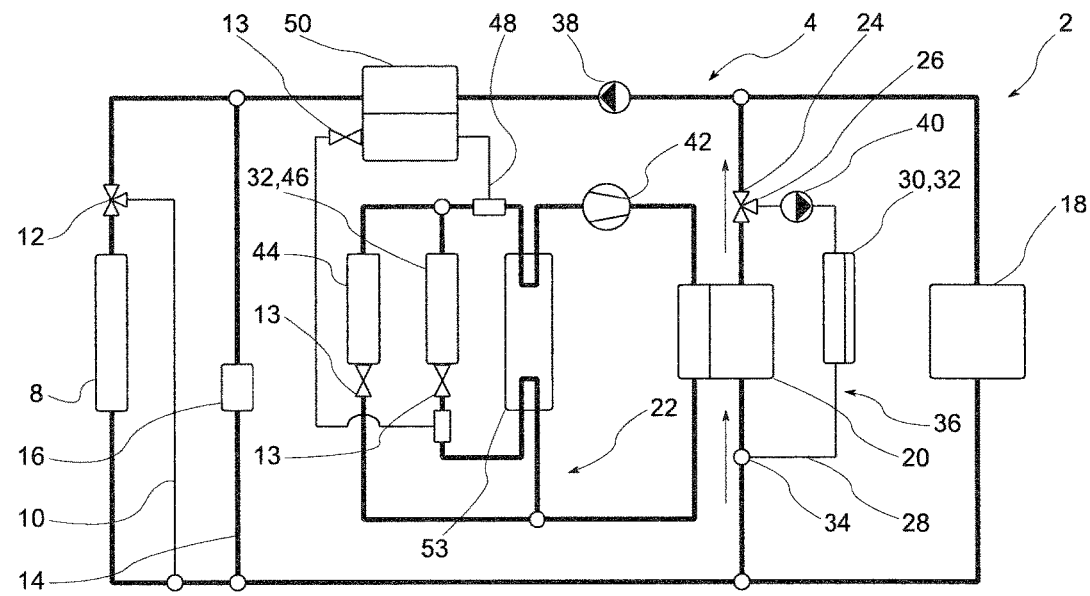
FIG. 1 shows a first connecting example of a heat pump system in the cooling mode.

Without loss of generality, the drawing dispenses with, in particular, the illustration of a possible additional sensor system, control electronics and a refrigerant collector which is present in some circumstances.

Figure 2:
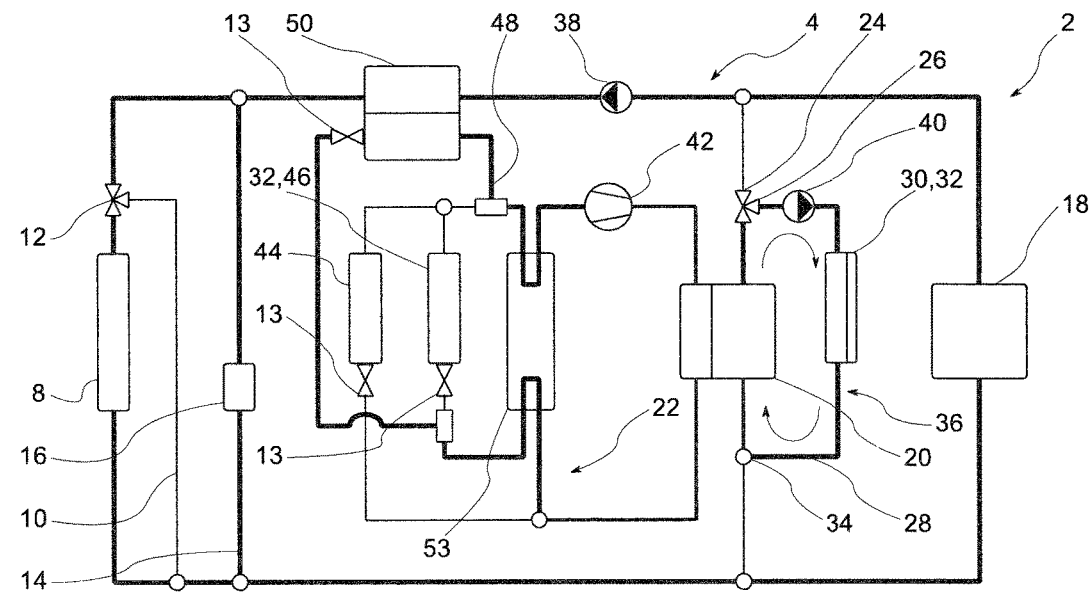
FIG. 2 shows the connecting example according to FIG. 1 in the heating mode.

FIGS. 1 and 2 show a first connecting example of a heat pump system 2 of a vehicle which is not shown in greater detail here, FIG. 1 showing the heat pump system 2 in the cooling mode and FIG. 2 showing it in the heating mode. Here, the paths which are run through by the coolant and by the refrigerant in the respective operating mode are shown using bold lines.

The heat pump system 2 comprises an LT circuit 4, in which the coolant, for example a water/glycol mixture, circulates. In the variant which is shown here, an LT cooler 8 is arranged in the LT circuit 4, which LT cooler 8 outputs heat in the cooling mode and can absorb heat in the heating mode. A valve 12 is arranged in a first LT cooler bypass 10, which valve 12 is configured here as a 3/2-way valve and serves to bypass the LT cooler 8, for example during the starting phase of the vehicle. An equalizing tank 16 is arranged in a second LT cooler bypass 14. Furthermore, at least one electrical power component 18 is arranged in the LT circuit 4, which power component 18 possibly outputs waste heat during operation and therefore serves as a heat source. The waste heat is transferred in a suitable way to the cooling liquid and therefore into the LT circuit 4. The power component 18 is, for example, one or more of the following components: high voltage accumulator, charging electronics, DC converter, electric drive machine. As an alternative, a plurality of said components are arranged in the LT circuit 4.

Furthermore, a condenser 20 is arranged in the LT circuit 4, for transferring heat from a refrigeration circuit 22 into the LT circuit 4. In the exemplary embodiment which is shown here, the condenser 20 is a heat exchanger which acts as a condenser 20 with regard to the refrigerant which circulates in the refrigeration circuit 22, and in the process transfers heat to the coolant. The condenser 20 acts in this way both in the heating mode and in the cooling mode.

The heat pump system 2 can be switched over between the cooling mode and the heating mode by means of a switchover valve 24. In the design variant which is shown here, the switchover valve 24 is configured as a 3/2-way valve and is arranged in the LT circuit 4 downstream of the condenser 20. In addition, the switchover valve 24 marks an inlet 26 to a heating branch 28, in which a heat exchanger for heating 30 is arranged which in turn is part of an air conditioning unit 32 for climate control of the passenger compartment (not shown in greater detail here) of the vehicle. The heating branch 28 is connected to the remaining LT circuit 4 via an outlet 34 upstream of the condenser 20. Together with that section between the outlet 34 and the inlet 26, on which the condenser 20 is arranged, the heating branch 28 forms a heating circuit 36, by means of which heat can be transferred from the condenser 20 to the heat exchanger for heating 30, for heating the passenger compartment of the vehicle.

For circulation of the coolant, a cooling circuit pump 38 is arranged in the LT circuit 4 and an additional heating circuit pump 40 is arranged in the heating circuit 36.

Figure 3:
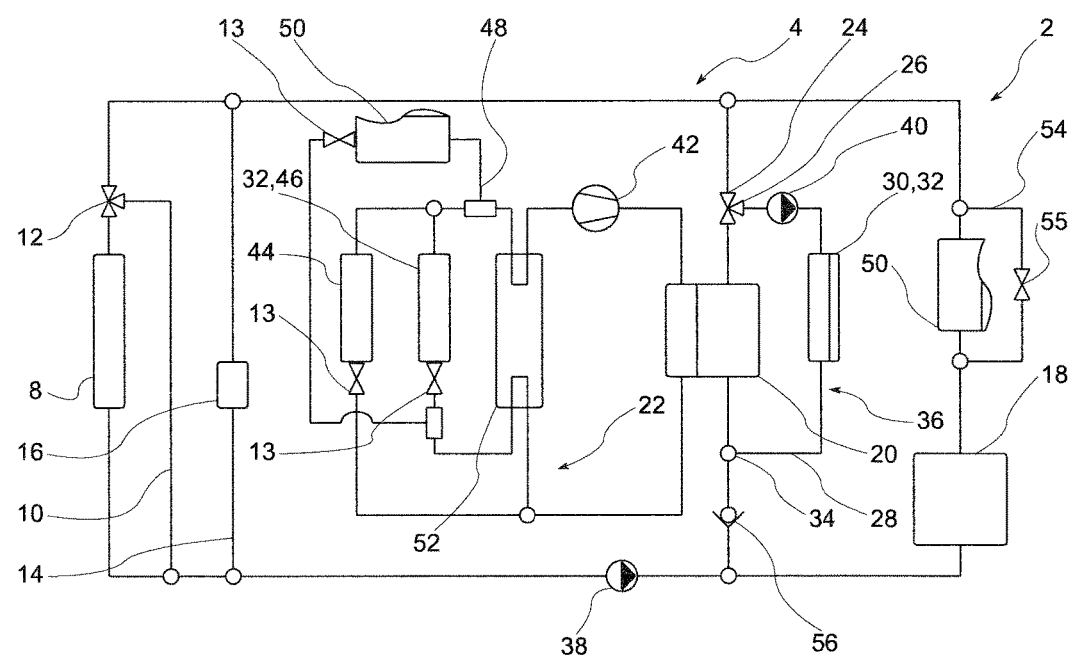
FIG. 3 shows a second connecting example.

The condenser 20 takes heat from the refrigeration circuit 22. In the latter, a compressor 42 is arranged upstream of the condenser 20, which compressor 42 compresses the refrigerant. In the exemplary embodiment which is shown here, two evaporators are connected in parallel to one another in the refrigeration circuit 22, the one evaporator being an HVA evaporator 44 which absorbs waste heat from a high voltage accumulator of the vehicle, and the other evaporator being an air conditioning unit evaporator 46 which is part of the air conditioning unit 32 for climate control of the vehicle. In each case one valve 13 which acts as an expansion valve and is closed in the heating mode is arranged upstream of the HVA evaporator 44 and the air conditioning unit evaporator 46. To this end, the valves 12 are configured, for example, as electric expansion valves, as thermostatic expansion valves with a respectively additional shut-off valve, or as what is known as an orifice with an additional shut-off valve. In addition, the refrigeration circuit 22 comprises an evaporator bypass 48, via which the air conditioning unit evaporator 46 is bypassed by the refrigerant in the heating mode, in order to absorb heat from the LT circuit 4 in a heat exchanger 50 which is arranged in the evaporator bypass 48. Here, the heat exchanger 50 acts as an evaporator. In order to activate the evaporator bypass 48, a further valve 13 which acts as an expansion valve is connected upstream of the heat exchanger 50. In addition, in the exemplary embodiment which is shown here, an inner heat exchanger 52 is arranged in the refrigeration circuit 22, for transferring heat from the refrigerant upstream of the air conditioning unit evaporator 46 to the refrigerant downstream of the air conditioning unit evaporator 46 and upstream of the compressor 42. In one variant which is not shown here, a division of the volumetric flow to the HVA evaporator 44 and the air conditioning unit evaporator 46 in the refrigeration circuit 22 does not take place upstream of the inner heat exchanger 52 as shown in FIGS. 1 to 3, but rather downstream and, in particular, upstream of the evaporator bypass 48.

In the cooling mode which is shown in FIG. 1, that is to say for cooling the passenger compartment of the vehicle by means of the air conditioning unit 32, heat is absorbed from the air conditioning unit evaporator 46 into the refrigeration circuit 22 and is output via the condenser 20 to the LT circuit 4. The switchover valve 24 guides the cooling liquid from the condenser 20 in the direction of the LT cooler 8 which outputs the heat to the surroundings. At the same time, the LT cooler 8 also outputs heat which is generated by the power component 18 to the surroundings. The heating branch 28 is shut off by way of the switchover valve 24, the heating circuit 36 is inactive, and the heating circuit pump 40 and the heat exchanger 50 are switched off in the cooling mode.

In the heating mode which is shown in FIG. 2, that is to say for heating the passenger compartment of the vehicle by means of the air conditioning unit 32, the switchover valve 24 is switched over in such a way that the cooling liquid is guided from the condenser 20 in the direction of the heating circuit pump 40 and is pumped by the latter through the heating circuit 36. In this way, the heat which is output by the condenser 20 to the LT circuit 4 is fed to the heating branch 28 and the heat exchanger for heating 30 which is arranged therein, and is used to heat the passenger compartment of the vehicle. Here, in the exemplary embodiment which is shown here, the heat which is taken from the refrigeration circuit 22 is introduced substantially by means of the heat exchanger 50 from the LT circuit 4 into the refrigeration circuit 22 and comes primarily from the power component 18. The valves 13 upstream of the HVA evaporator 44 and the air conditioning unit evaporator 46 are closed, and the refrigerant is guided via the evaporator bypass 48 through the heat exchanger 50. Here, the LT cooler 8 can either be deactivated or, as an alternative, can be used for absorbing heat from the surroundings. The heating circuit 36 is closed, in particular, with respect to the rest of the LT circuit 4, such that no coolant which circulates in the heating circuit 36 passes into the remaining LT circuit 4.

In particular for dehumidifying the passenger compartment of the vehicle and/or for simultaneously cooling the high voltage accumulator of the vehicle in the heating mode, it is possible to combine the methods of operation which are shown here, that is to say the heating mode and the cooling mode, in a mixed mode. To this end, in particular in the heating mode which is shown in FIG. 2, the valve 13 which is connected upstream of the air conditioning unit evaporator 46 is open.

FIG. 2 shows a second connecting example of the heat pump system 2. Here, the heat exchanger 50 is incorporated into the LT circuit 4 directly downstream of the power component. For simplified illustration, the heat exchanger is shown in a correspondingly split manner in FIG. 2. Furthermore, the LT circuit 4 has a heat exchanger bypass 54 with a bypass valve 55, for bypassing the heat exchanger 50. In addition, the cooling circuit pump 38 is arranged upstream, that is to say so as to exert pressure, with regard to the condenser. Furthermore, a check valve 56 is arranged in the LT circuit upstream of the condenser, in order to prevent a return flow of the coolant from the heating circuit 36 in the heating mode.

LIST OF DESIGNATIONS

2 Heat pump system
4 LT circuit
8 LT cooler
10 First LT cooler bypass
12 Valve (3/2-way valve)
13 Valve (expansion valve)
14 Second LT cooler bypass
16 Equalizing tank
18 Power component
20 Condenser
22 Refrigeration circuit
24 Switchover valve
26 Inlet
28 Heating branch
30 Heat exchanger for heating
32 Air conditioning unit
34 Outlet
36 Heating circuit
38 Cooling circuit pump
40 Heating circuit pump
42 Compressor
44 HVA evaporator
46 Air conditioning unit evaporator
48 Evaporator bypass 50 Heat exchanger
52 Inner heat exchanger
54 Heat exchanger bypass
55 Bypass valve
56 Check valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A heat pump system for climate control of an electric or hybrid vehicle comprising:
    an air conditioning unit having a heating heat exchanger arranged in a heating circuit;
    an air conditioning unit evaporator arranged in a refrigeration circuit, in which a condenser is also arranged;
    a low temperature (LT) circuit in which at least one electrical power component and an LT cooler are arranged, the LT circuit having a common portion that is common to the heating circuit,
        wherein the condenser thermally couples the refrigeration circuit to the LT circuit at the common portion, and is configured to thereby transfer heat into the LT circuit from the refrigeration circuit,
        wherein the heat pump system is configured to switch between a cooling mode and a heating mode via operation of a switchover valve arranged at the common portion,
        wherein, in the heating mode, the condenser transfers heat from the refrigeration circuit into the heating circuit and the heating heat exchanger via the common portion, and
        wherein, in the cooling mode, the condenser transfers heat from the refrigeration circuit into the LT circuit and the LT cooler via the common portion; and
    a heat exchanger connected in parallel to the air conditioning unit evaporator, wherein the heat exchanger is configured to transfer heat out of the LT circuit into the refrigeration circuit in the heating mode.

2. The heat pump system as claimed claim 1, wherein a switchable heat exchanger bypass is arranged in the LT circuit and is configured to bypass the heat exchanger.

3. The heat pump system as claimed claim 1, wherein the condenser, the heat exchanger and the LT cooler are connected in series in the LT circuit, and wherein the heat exchanger is arranged between the condenser and the LT cooler.

4. The heat pump system as claimed in claim 2, wherein the condenser, the heat exchanger and the LT cooler are connected in series in the LT circuit, and wherein the heat exchanger is arranged between the condenser and the LT cooler.

5. The heat pump system as claimed in claim 1, wherein the heat exchanger is arranged in the LT circuit downstream of the at least one electrical power component.

6. The heat pump system as claimed in claim 2, wherein the heat exchanger is arranged in the LT circuit downstream of the at least one electrical power component.

7. The heat pump system as claimed in claim 3, wherein the heat exchanger is arranged in the LT circuit downstream of the at least one electrical power component.

8. The heat pump system as claimed in claim 1, wherein, in addition to the heating mode and the cooling mode, the heat pump system is configured to be switched over into a mixed mode.

9. The heat pump system as claimed in claim 1, wherein the condenser outputs heat from the refrigeration circuit to the LT circuit in each of the cooling mode and the heating mode.

10. The heat pump system as claimed in claim 1, further comprising an inner heat exchanger arranged in the refrigeration circuit.

11. The heat pump system as claimed in claim 1, wherein a coolant flows through the condenser in the same direction in the cooling mode and in the heating mode.

12. The heat pump system as claimed in claim 1, wherein the heating circuit is connected to the LT circuit upstream and downstream of the condenser.

13. The heat pump system as claimed in claim 1, wherein the switchover valve is configured as a 3/2-way valve for switching over between the cooling mode and the heating mode.

14. The heat pump system as claimed in claim 1, wherein the at least one electrical power component is arranged in the LT circuit in parallel with the condenser.

15. The heat pump system as claimed in claim 1, further comprising a first LT cooler bypass, configured to bypass the LT cooler, arranged in the LT circuit.

16. A method for operating the heat pump system of claim 1, the method comprising:
    switching, via the switchover valve, the heat pump system the heating mode into the cooling mode; and
    switching, via the switchover valve, the heat pump system the cooling mode into the heating mode.

17. The method as claimed in claim 16, further comprising operating the heat pump system of claim 1 in a mixed mode such that at least one of a passenger compartment of the vehicle is dehumidified and the at least one electrical power component is cooled in the heating mode.

18. The method as claimed claim 16, further comprising absorbing heat, in the heating mode, into the LT circuit via the LT cooler.

* * * * *